United States Patent
Fechtel et al.

(10) Patent No.: US 8,488,687 B2
(45) Date of Patent: Jul. 16, 2013

(54) WEIGHTING CIRCUIT FOR A MULTI-CARRIER SIGNAL RECEIVER

(75) Inventors: Stefan Fechtel, Munich (DE); Andreas Menkhoff, Oberhaching (DE)

(73) Assignee: Infineon Technologies AG, Munich (DE)

(*) Notice: Subject to any disclaimer, the term of this patent is extended or adjusted under 35 U.S.C. 154(b) by 832 days.

(21) Appl. No.: 10/566,531

(22) PCT Filed: Jul. 23, 2004

(86) PCT No.: PCT/EP2004/008277
§ 371 (c)(1),
(2), (4) Date: Jul. 31, 2006

(87) PCT Pub. No.: WO2005/013575
PCT Pub. Date: Feb. 10, 2005

(65) Prior Publication Data
US 2007/0002955 A1    Jan. 4, 2007

(30) Foreign Application Priority Data

Jul. 30, 2003  (DE) .................................. 103 34 842

(51) Int. Cl.
   *H04L 27/28*   (2006.01)
(52) U.S. Cl.
   USPC .............................. 375/260; 375/285; 375/346
(58) Field of Classification Search
   USPC ..................... 375/260, 278, 284, 285, 346
   See application file for complete search history.

(56) References Cited

U.S. PATENT DOCUMENTS

| | | | | |
|---|---|---|---|---|
| 5,175,558 | A | * | 12/1992 | DuPree .......................... 342/378 |
| 6,122,703 | A | * | 9/2000 | Nasserbakht ..................... 711/5 |
| 6,317,470 | B1 | | 11/2001 | Kroeger et al. |
| 6,643,339 | B1 | * | 11/2003 | Okanoue et al. .............. 375/349 |
| 6,674,820 | B1 | * | 1/2004 | Hui et al. ....................... 375/346 |
| 2003/0084079 | A1 | * | 5/2003 | Awad et al. ................... 708/322 |
| 2003/0128751 | A1 | * | 7/2003 | Vandenameele-Lepla ... 375/229 |

OTHER PUBLICATIONS

German Office Action dated Nov. 10, 2003.
German Office Action dated Jul. 7, 2004.
International Search Report dated Jul. 23, 2004.
International Preliminary Examination Report (English annexes) dated Oct. 17, 2005.
Hagenauer, Joachim: "Log-likelihood Ratios, Mutual Information and Exit Charts—A Primer," *Lecture at the 2002 12th Joint Conference on Communications and Coding*, Saas Fe, Switzerland, Mar. 5, 2002.
Starr et al: "Understanding Digital Subscriber Line Technology," *Communication Engineering and Emerging Technologies*, 1999, pp. 221-223.
Werner, Martin: "Maximum-Likelihood-Decodierung," *Information und Codierung*, 2002, pp. 185-196.

* cited by examiner

*Primary Examiner* — Shuwang Liu
*Assistant Examiner* — David Huang
(74) *Attorney, Agent, or Firm* — Jenkins, Wilson, Taylor & Hunt, P.A.

(57) ABSTRACT

The invention relates to a weighting circuit for a receiver (1), which is designed to receive a multi-carrier signal consisting of carrier signals. According to the invention, the carrier signals are weighted by the weighting circuit (18) in such a way that the parasitic signal energy has the same intensity in all weighted carrier signals. In a preferred embodiment of the invention, the weighting circuit comprises at least one multiplier that multiplies an assigned a carrier signal by a stored weighting co-efficient. The stored weighting coefficients constitute reliability information for the various carrier signals.

5 Claims, 10 Drawing Sheets

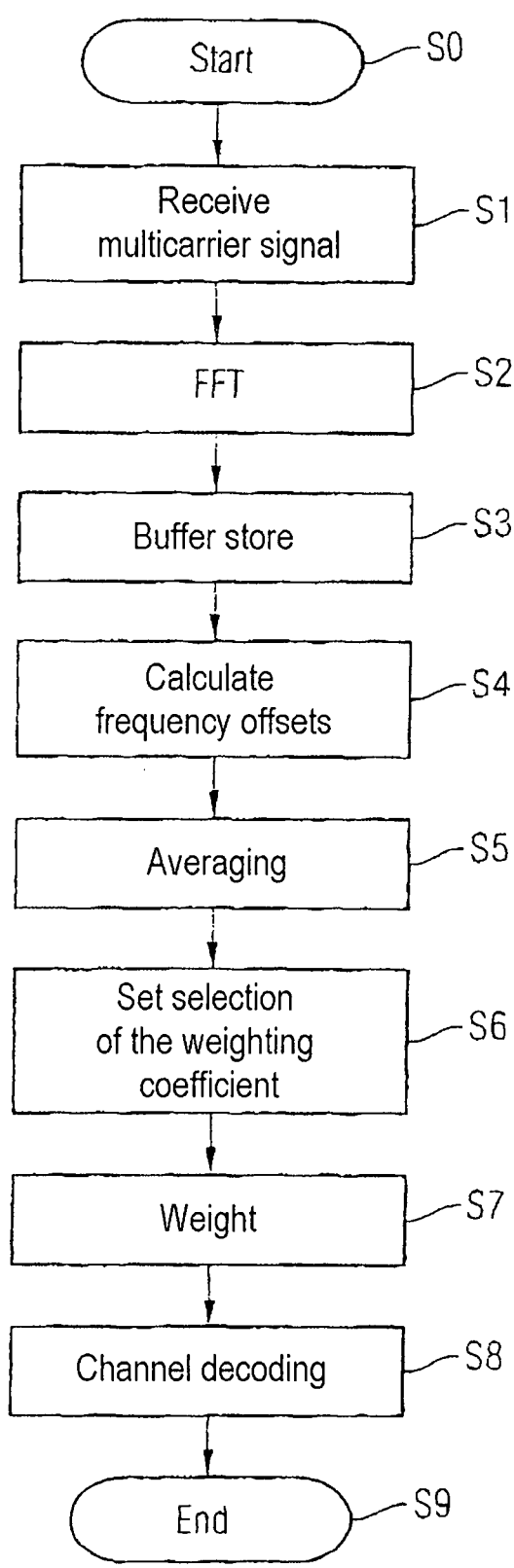

WEIGHTING CIRCUIT FOR A MULTI-CARRIER SIGNAL RECEIVER

TECHNICAL FIELD

The invention relates to a weighting circuit for a multicarrier signal receiver which is provided for receiving a multicarrier signal comprising carrier signals, particularly for an OFDM receiver.

BACKGROUND

In the case of multicarrier signal transmission, the data information is transmitted on a plurality of carrier signals which have different carrier signal frequencies. Known multicarrier reception systems are DMT and OFDM (Orthogonal Frequency Division Multiplexing). Particularly in the case of mobile radio transmission, data symbols expand or overlap one another. If the delay spread of the data transmission channel is in the region of the data symbol duration, a high level of intersymbol interference may arise which makes error-free decoding impossible unless appropriate countermeasures, such as equalizers, are used. In the case of application at high data transmission rates such channel equalizers are very complex, however. Multicarrier transmission allows these drawbacks to be avoided. In the case of OFDM, the data stream to be transmitted is split into a plurality of portions and is transmitted in parallel on various signal carrier. Each subchannel may be submodulated for its part. The data transmission rate of a carrier is reduced by the parallelization. This reduces the intersymbol interference for the data transmission. The OFDM receiver performs the splitting into the subchannel or carrier signal. After filtering, sapling and demodulation, the parallel data are converted back into a serial data stream.

FIG. 1 shows a signal spectrum for a multicarrier signal transmission. The data are transmitted in a transmission frequency band which contains a multiplicity of sub-bands $SB_i$. The sub-bands $SB_i$ normally have the same frequency bandwidth $\Delta_f$. In many cases, the multicarrier system has more than 1000 sub-bands $SB_i$. During transmission using frequency-selective multipath channels, one or more attenuation maxima, i.e. amplitude minima, may fall into the transmission band. In this case, by way of example, one sub-band $SB_j$ may be situated at an attenuation maximum while another sub-band $SB_i$ is situated at an attenuation minimum. The amplitudes of the various sub-bands SB are therefore very different. Close to an attenuation maximum, the amplitude of the useful signal is relatively small. As FIG. 1 shows, the sub-band $SB_i$ has a very small amplitude on account of a very high attenuation transmission channel.

Besides the useful signal, the receiver receives a background noise $N_0$, which is essentially constant over the entire transmission frequency band, and external spurious signals. These external spurious signals may be signals from other signal sources or television signals, for example. The external spurious signals NF are overlaid on the background noise $N_0$ to form a cumulative spurious signal, as shown in FIG. 1.

The received signal in the receiver is made up as follows:

$$E = N_0 + NF(f) + S(f) \qquad (1)$$

where $N_0$ is a largely evenly distributed background noise, $NF(f)$ is a frequency-dependent spurious signal, and $S(f)$ is the useful signal.

FIG. 2 shows a multicarrier signal receiver based on the prior art.

The receiver contains a tuner for tuning to the received signal, a downstream antialiasing filter AAF and an analog-digital converter for converting the received analog signal into a digital received signal. At the output of the analog-digital converter, the digital received signal is firstly supplied to a subtraction circuit SUB and to an estimation unit. The estimation unit calculates the cumulative spurious signal. The estimated cumulative spurious signal is deducted from the input signal E by the subtraction unit SUB, so that ideally just an undisturbed useful signal S remains and is processed further. The estimation unit shown in FIG. 2 performs cross correlation between the output signal from the ADC and one or more spurious signals which are to be expected.

In the case of an OFDM receiver, based on the prior art, the data are lined up symbol by symbol and are separated by one another by the guard interval. Normally, an unknown sudden phase change occurs between the data symbols. Accordingly, to subtract the estimated signal with the correct phase, the estimation unit ascertains a first cross correlation value between the received signal and a stored spurious signal which is to be expected and also a second cross correlation value between the received signal and the spurious signal to be expected which has been phase-shifted through 90°. The estimation unit then calculates the phase of the spurious signal on the basis of the cross correlation values. The calculation of this phase is severely susceptible to error.

One drawback of the conventional multicarrier signal receiver as shown in FIG. 2 is that the spurious signal needs to be estimated on the basis of magnitude and phase, which makes such estimation difficult and susceptible to error. Estimating the spurious signal becomes a very imprecise affair if the variance in the estimate result 'measurement time' is relatively high, e.g. because the available measurement time is too short.

The greater the discrepancy between the estimated spurious signal and the spurious signal which actually occurs, the more the bit error rate BER of the received data stream which is output by the channel decoder increases.

SUMMARY OF THE INVENTION

It is therefore the object of the present invention to increase the reception quality of a multicarrier signal receiver.

The invention achieves this object by means of a weighting circuit for a multicarrier signal receiver which has the features indicated in patent claim 1.

The invention provides a weighting circuit for a receiver which is provided for receiving a multicarrier signal comprising a plurality of carrier signals, where the weighting circuit weights the carrier signals ideally such that the spurious signal energy is of equal magnitude for all weighted carrier signals.

In one preferred embodiment of the inventive weighting circuit, said circuit has at least one multiplier which multiplies an associated carrier signal by a stored weighting coefficient.

The stored weighting coefficients represent reliability information for the various carrier signals. The greater the noise on a subcarrier signal or a carrier signal, the lower the associated reliability or the weighting coefficient. A subcarrier with a high level of noise or a carrier signal with a high level of noise is weighted with a smaller weighting coefficient than a carrier signal with a lower level of noise.

In one preferred embodiment, the weighting circuit has a memory which stores a plurality of weighting coefficient sets $G_i$ which each comprise a plurality of weighting coefficients $g_i$.

The memory can preferably be programmed via an interface.

This allows the weighting coefficients to be matched to the transmission properties of the data transmission channel.

In another preferred embodiment, the weighting circuit has a selector which selects a particular weighting coefficient set $G_i$ from the weighting coefficient sets stored in the memory.

In this context, the selector preferably selects a weighting coefficient set on the basis of an expected spurious signal energy.

In another preferred embodiment, the selector selects a weighting coefficient set additionally on the basis of an averaged frequency offset between the maximum of the spurious signal spectrum and the next closest carrier signal of the multicarrier signal.

The multicarrier signal is preferably broken down into the carrier signals by a computation circuit.

The computation circuit is preferably a Fast Fourier Transformation circuit.

The carrier signals broken down by the computation circuit are preferably buffer-stored in a buffer store for the subsequent multiplication.

In a first embodiment, the expected spurious signal energy can be set externally.

In an alternative embodiment, the expected spurious signal energy is calculated by an estimation unit on the basis of the received multicarrier signal.

Further preferred embodiments of the inventive weighting circuit and further features which are fundamental to the invention are described below with reference to the appended figures, in which:

BRIEF DESCRIPTION OF THE DRAWINGS

FIG. 8 shows a flowchart to explain the way in which the inventive weighting circuit works;

DETAILED DESCRIPTION OF THE INVENTION

Figure 1:
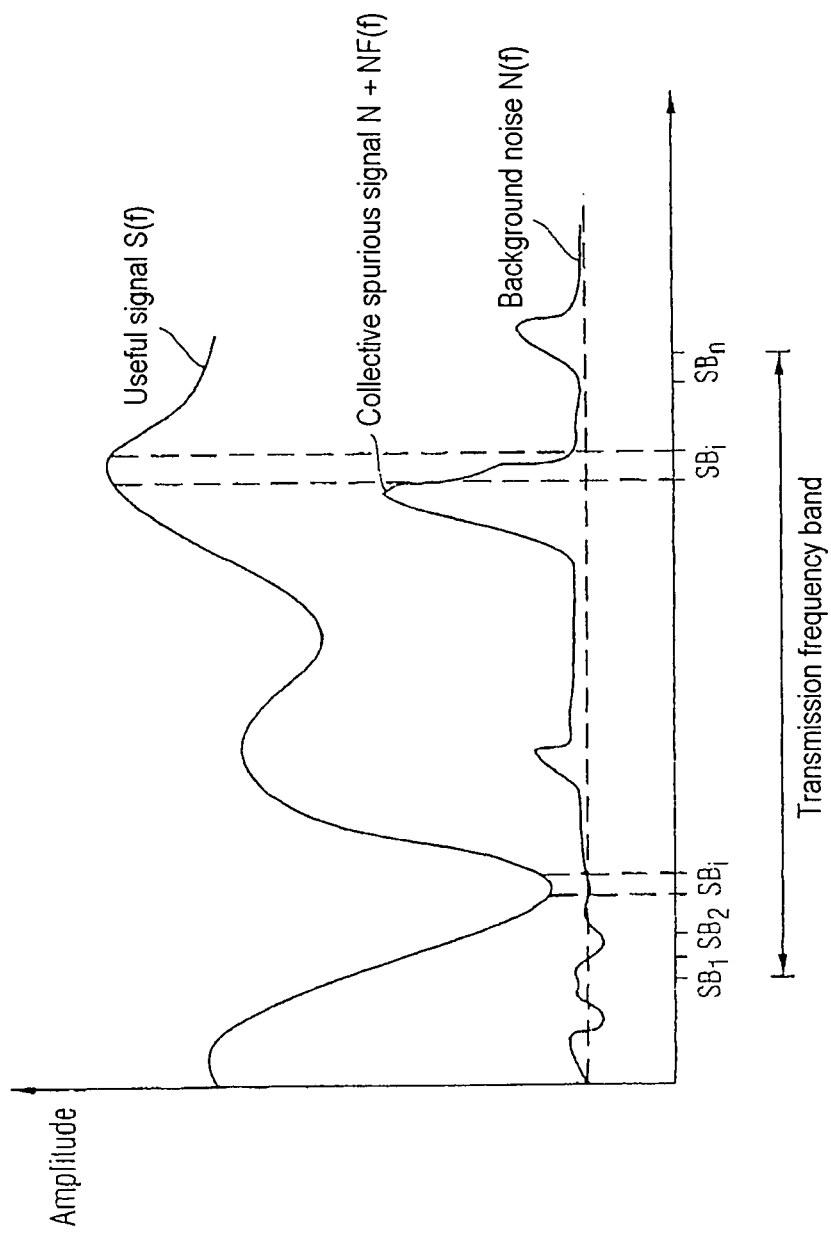
FIG. 1 shows a signal spectrum for a received signal.
Figure 2:
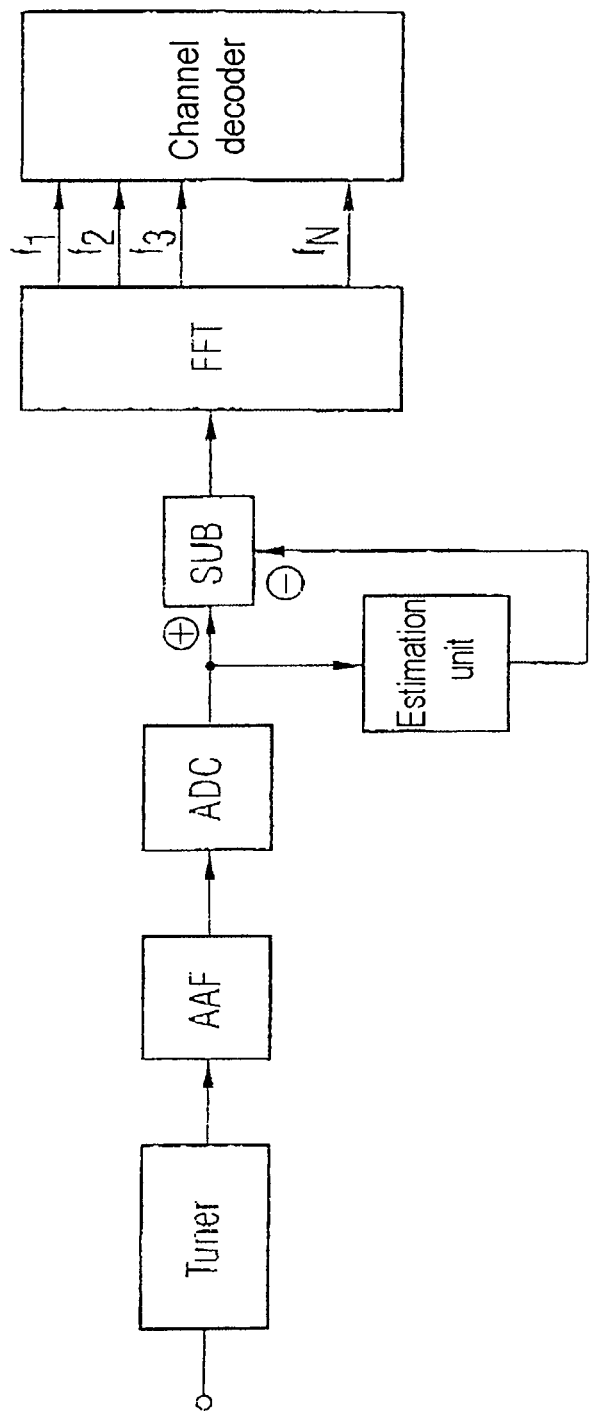
FIG. 2 shows a multicarrier signal receiver based on the prior art.
Figure 3:
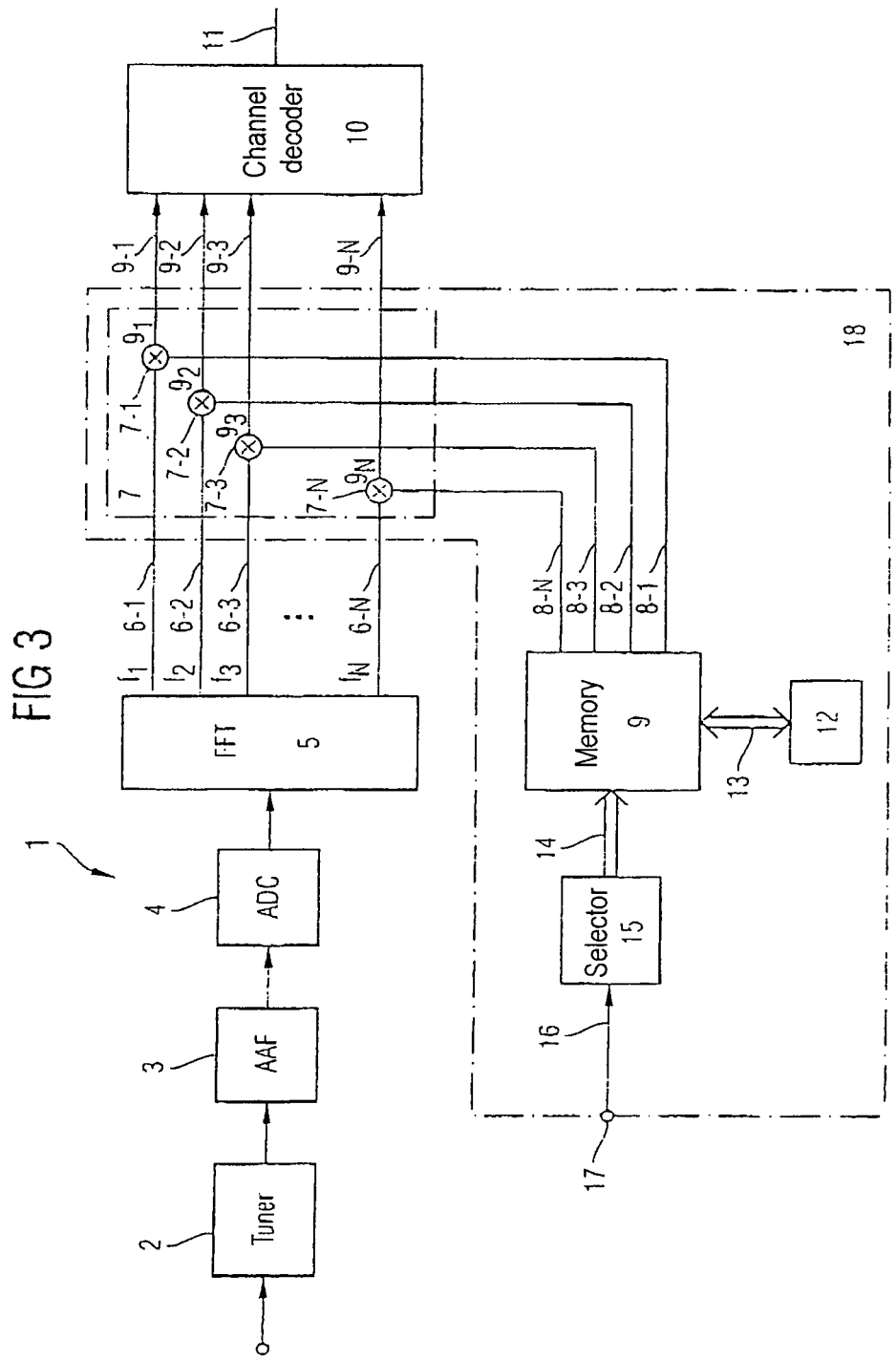
FIG. 3 shows a multicarrier signal receiver which contains an inventive weighting circuit based on a first embodiment.

FIG. 3 shows a multicarrier signal receiver 1 which contains a first embodiment of the inventive weighting circuit. The multicarrier signal receiver 1 contains a tuner 2 for tuning to the received signal, the tuner 2 having an antialiasing filter 3 connected downstream of it. The filtered received signal is converted into a digital received signal by an analog-digital converter 4 and is supplied to a computation circuit 5. the computation circuit 5 breaks down the received digital multicarrier signal into various carrier signals which have different carrier signal frequencies $f_1, f_2, f_3, \ldots, f_N$. The computation circuit 5 is preferably a filter bank, particularly a Fast Fourier Transformation circuit (FFT). The amplitudes of the carrier signals are supplied via lines 6-1, 6-2, 6-3, ..., 6-N to a multiplier circuit 7 having an appropriate number of multipliers 7-1, 7-2, 7-3, ..., 7-N. The multipliers 7-$i$ multiply the respective carrier signal by a weighting factor $G_i$ which is read from a programmable memory 9 via an associated line 8-$i$. The weighted carrier signals are supplied via lines 9-$i$ to a channel decoder 10 which decodes the weighted carrier signals and compiles them to form a digital data stream for further data processing. The channel decoder 10 is preferably a Viterbi decoder, which often has a Read-Solomon decoder connected downstream of it. The channel decoder 10 outputs the serial digital data stream via a line 11 for further data processing.

Figure 7:
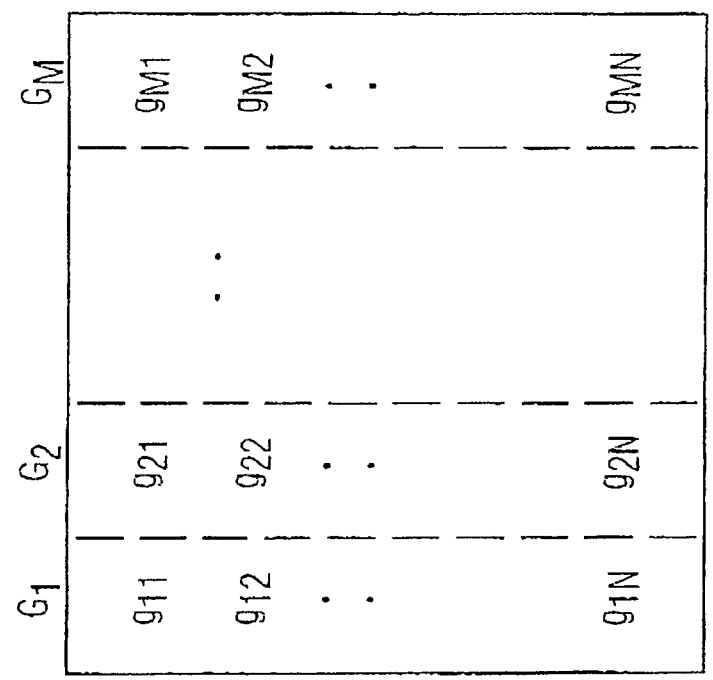
FIG. 7 shows a table of the memory content of a programmable memory in the inventive weighting circuit.

The programmable memory 9 can be programmed externally via an interface circuit 12. The interface circuit 12 is connected to the programmable memory 9 via internal data lines 13. The programmable memory 9 contains a plurality of weighting coefficient sets $G_i$, as shown schematically in FIG. 7 by way of example. Each weighting coefficient set $G_i$ contains a multiplicity of weighting coefficients $G_i$, with the number N of weighting coefficients corresponding to less than or equal to the number of sub-bands SB within the transmission frequency band. The number N of different weighting coefficient sets $G_i$ can be chosen and is 8, for example. The programmable memory 9 is connected to a selector 15 via address lines 14. The selector 15 selects a particular weighting coefficient set $G_i$ from a plurality of M different weighting coefficient sets which are stored within the memory 9. To this end, the selector 15 generates an address for selecting the appropriate weighting coefficient set G.

In the case of the first embodiment of the inventive weighting circuit, shown in FIG. 3, the weighting coefficient set $G_i$ is selected on the basis of an expected spurious signal energy, the expected spurious signal energy $EP_{spurious}$ in the first embodiment shown in FIG. 3 being set externally via a line 16. The spurious signal energy is proportional to the square of the amplitude of the cumulative spurious signal, which is made up of the background noise $N_0$ and external spurious signals. The expected spurious signal energy $EP_{spurious}$ is applied via a setting input 17. The first embodiment of the inventive weighting circuit 18 comprises the multiplier circuit 7 for multiplying the carrier signals by the selected weighting coefficients, the programmable memory 9 with the associated interface circuit 12 and also the selector 15 for selecting the weighting coefficient set.

Figure 4:
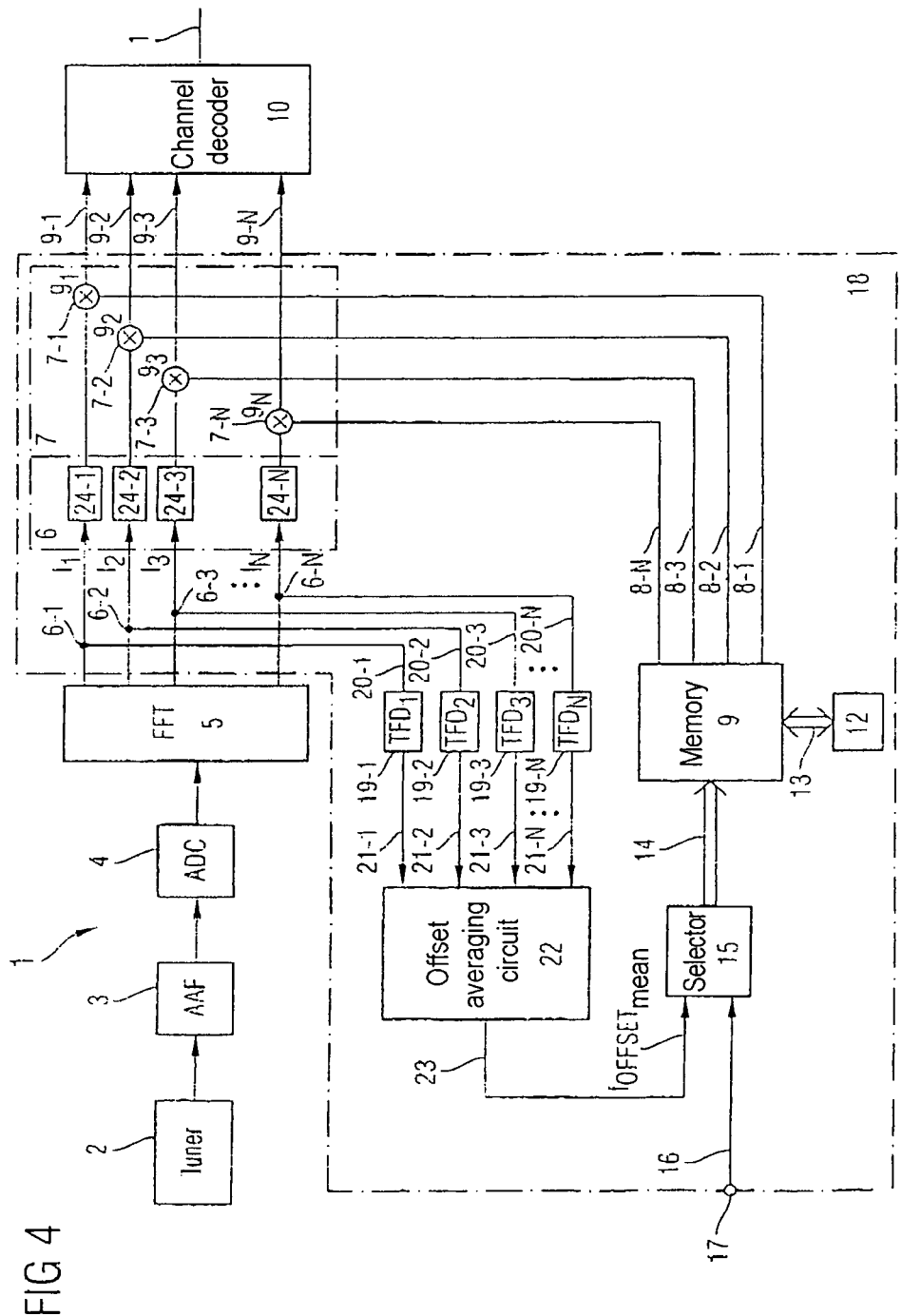
FIG. 4 shows a multicarrier signal receiver which contains an inventive weighting circuit based on a second embodiment.

FIG. 4 shows a multicarrier signal receiver 1 which contains a second embodiment of the inventive weighting circuit 18. Corresponding components have been provided with corresponding reference symbols.

In the case of the second embodiment of the inventive weighting circuit, shown in FIG. 4, the selector 15 makes the selection of the weighting coefficient set $G_i$ not only on the basis of the spurious signal energy $EP_{spurious}$ which has been set but also on the basis of an average frequency offset. To this end, the weighting circuit 18 additionally contains carrier frequency detectors 19-1, 19-2, ..., 19-N, which are connected to the output lines 6-1, 6-2, ..., 6-N via lines 20-1, 20-2, ..., 20-N. The carrier frequency detectors 19-$i$ ascertain each carrier signal's actual carrier frequency $f_i$ and output the discrepancy or the offset $\Delta_{fi}$ between the current or actual carrier frequency $f_i$ and the nominal frequency $f_{nominal}$ for this carrier signal to an offset averaging circuit 22 via an associated output line 21-$_i$. Such carrier frequency detectors 19-$_i$ are described in "Digital Communications Receivers" by Heinrich Meyr, Stephan, A. Fechtel in John Wiley and Sons, 1998, Section 8 (pp. 445-504). The offset averaging circuit 22 calculates an average $f_{OFFSET\text{-}mean}$ for all ascertained frequency offsets of the various carrier signals. The offset averaging circuit 22 is preferably a proportional-integral computation element. In this case, the averaging time is preferably settable.

Figure 10:
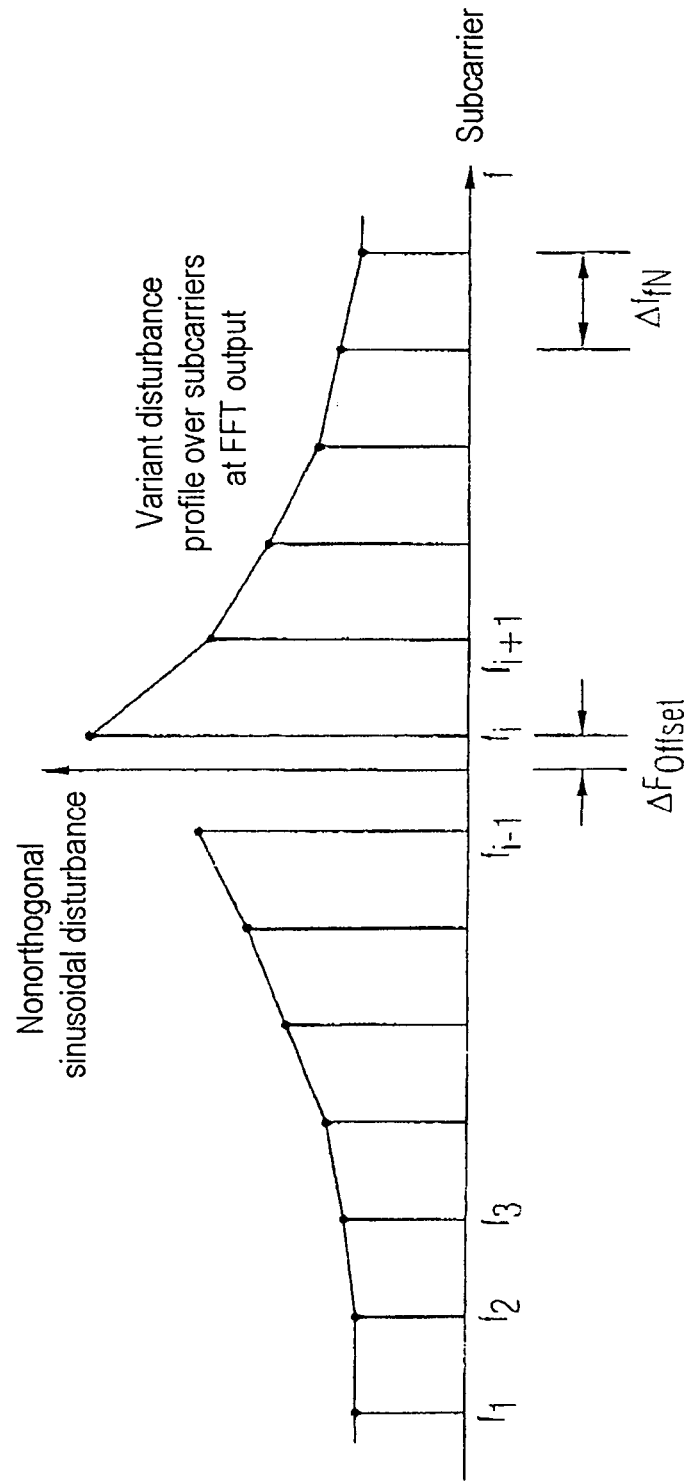
FIG. 10 shows a signal spectrum to explain the way in which the inventive weighting circuit works.

FIG. 10 shows the spectrum of an OFDM received signal with a sinusoidal spurious signal. As can be seen in FIG. 10, the nonorthogonal sinusoidal spurious signal is situated outside of the framework of the received OFDM signal, which comprises a multiplicity of carrier signals with carrier frequencies $f_i$. Demodulating the OFDM signal using the Fast Fourier Transformation circuit 5 distributes the energy of the spurious signal over the surrounding subcarriers or carrier signals, with the attenuation being dependent on the subcarrier and on the parasitic frequency. The disturbances which occur on the output lines 6-$_i$ of the Fast Fourier Transformation circuit 5 are reduced by the inventive weighting circuit 18 for a stipulated number of carrier signals such that a previously determined noise level is set.

The energy level of the cumulative spurious signal, which is made up of an external spurious signal and the noise, is obtained as:

$$EP_{spurious} = 10 \cdot \log [10^{0.1*N_0} + 10^{0.1*NF}] \text{ in dB} \quad (2)$$

where the energy level of the cumulative spurious signal $EP_{spurious}$ is dependent on the external spurious signal NF and on the background noise $N_0$.

The weighting coefficient $g_i$ is calculated on the basis of the expected spurious signal energy $EP_{spurious}$ as follows:

$$g_i = 10^{EP_{spurious}/20} \quad (3)$$

If, by way of example, the noise is normalized to zero decibels and if the level of the spurious signal after Fast Fourier Transformation on a subcarrier is 10 dB higher than that of the noise signal, the total energy $EP_{spurious}$ of the spurious signal and the noise in line with equation (2) is:

$$10 \cdot \log [10^0 + 10^{0.1 \cdot 10}] = 10.414 \text{ dB}.$$

From this, the weighting factor $G_i$ is calculated as $$10^{(-10.414/20)} = 0.3015.$$

In the case of the implementation of the inventive weighting circuit 18, a weighting set $G_i$, which comprises suitably dimensioned weighting coefficients $g_i$, is calculated in advance and is written to the memory 9 via the interface circuit 12. The weighting coefficients selected by the selector 15 are multiplied by the carrier signals by the multiplier circuit 7. In this case, either amplitudes of the various carrier signals can be buffer-stored by a buffer store 24, which comprises various latch components 24'$i$, before the multiplication, as FIG. 4 shows, or the weighting coefficients which have been read are used for multiplication by the next block of N-composed carrier signal amplitudes which are output by the FFT circuit 5.

Figure 5:
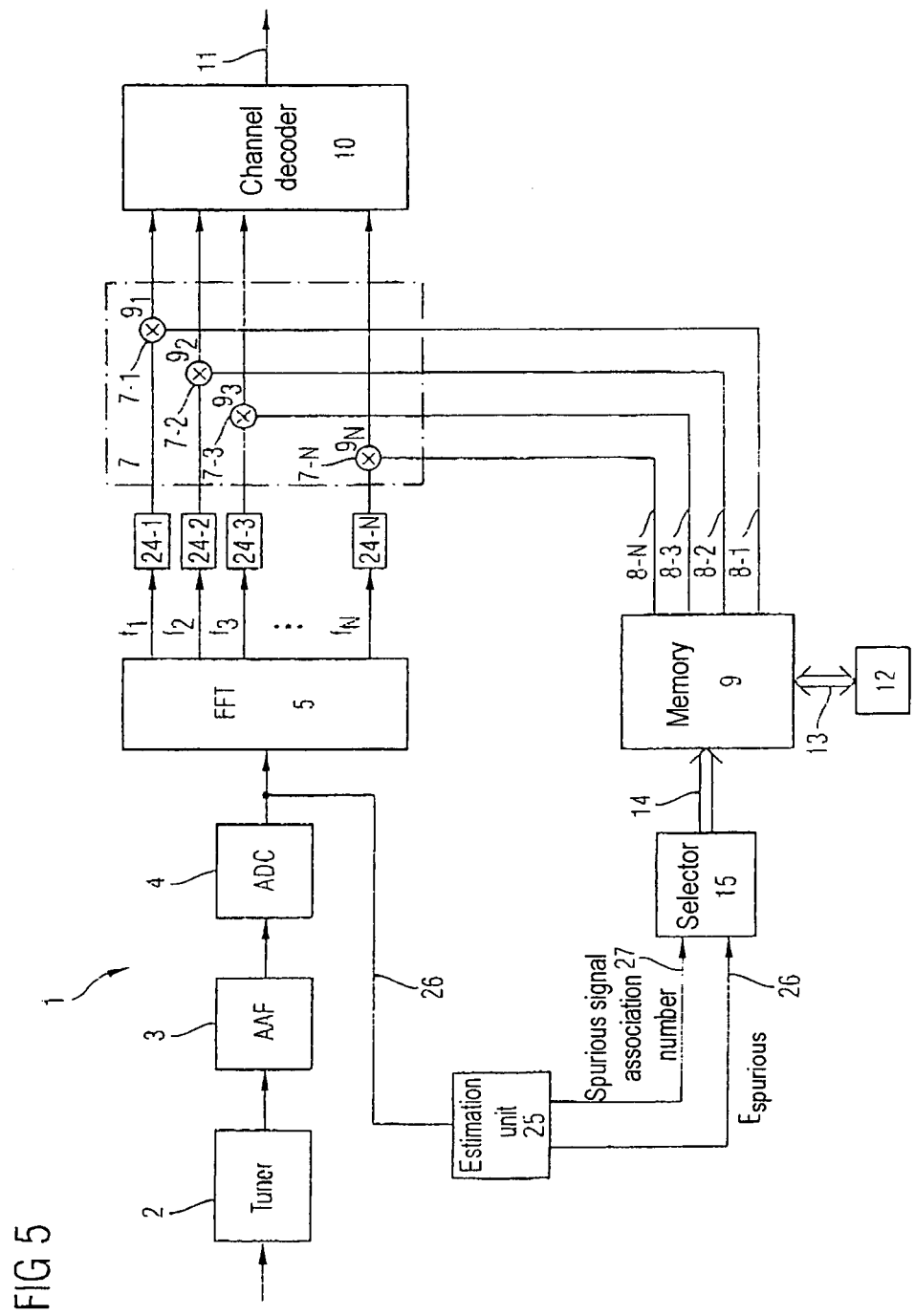
FIG. 5 shows a multicarrier signal receiver which contains an inventive weighting circuit based on a third embodiment.

FIG. 5 shows a third embodiment of the inventive weighting circuit 18.

In this embodiment, the selector 15 makes the selection of the weighting coefficient set $G_i$ within the memory 9 not on the basis of an expected externally set spurious signal energy but rather on the basis of an estimated spurious signal energy which is ascertained by an estimation unit 25. The estimation unit 25 is connected downstream of the analog-digital converter 4 via line 26 and calculates a maximum spurious signal level on the basis of the received digital multicarrier signal. The estimation unit 25 performs first cross correlation between the received signal which is present at the output of the ADC 4 and with at least one spurious signal which is to be expected, in order to calculate a first cross correlation value $k_1$, and second cross correlation between the received signal and a spurious signal to be expected which has been phase-shifted through 90°, in order to calculate a second cross correlation value $k_2$. On the basis of the two cross correlation values $k_1$, $k_2$, the energy of the current disturbance in the received signal is calculated by the estimation unit, $$E_{spurious} \sim k_1^2 + k_2^2$$

The estimation unit 25 preferably stores a plurality of spurious signals which are to be expected, for example spurious signals whose frequency has been shifted relative to one another. The spurious signals to be expected alternatively have different signal shapes, so as to simulate spurious signals from different signal sources or signal distortions. The estimation unit 25 outputs the calculated maximum spurious signal energy $E_{spurious\ max}$ via line 26 and the associated spurious signal association number via line 27 to the selector 15, the spurious signal association number indicating the associated spurious signal.

The selector 15 selects a weighting coefficient set on the basis of the spurious signal association number, which indicates the type of spurious signal or this signal shape, and the calculated spurious signal energy.

Figure 6:
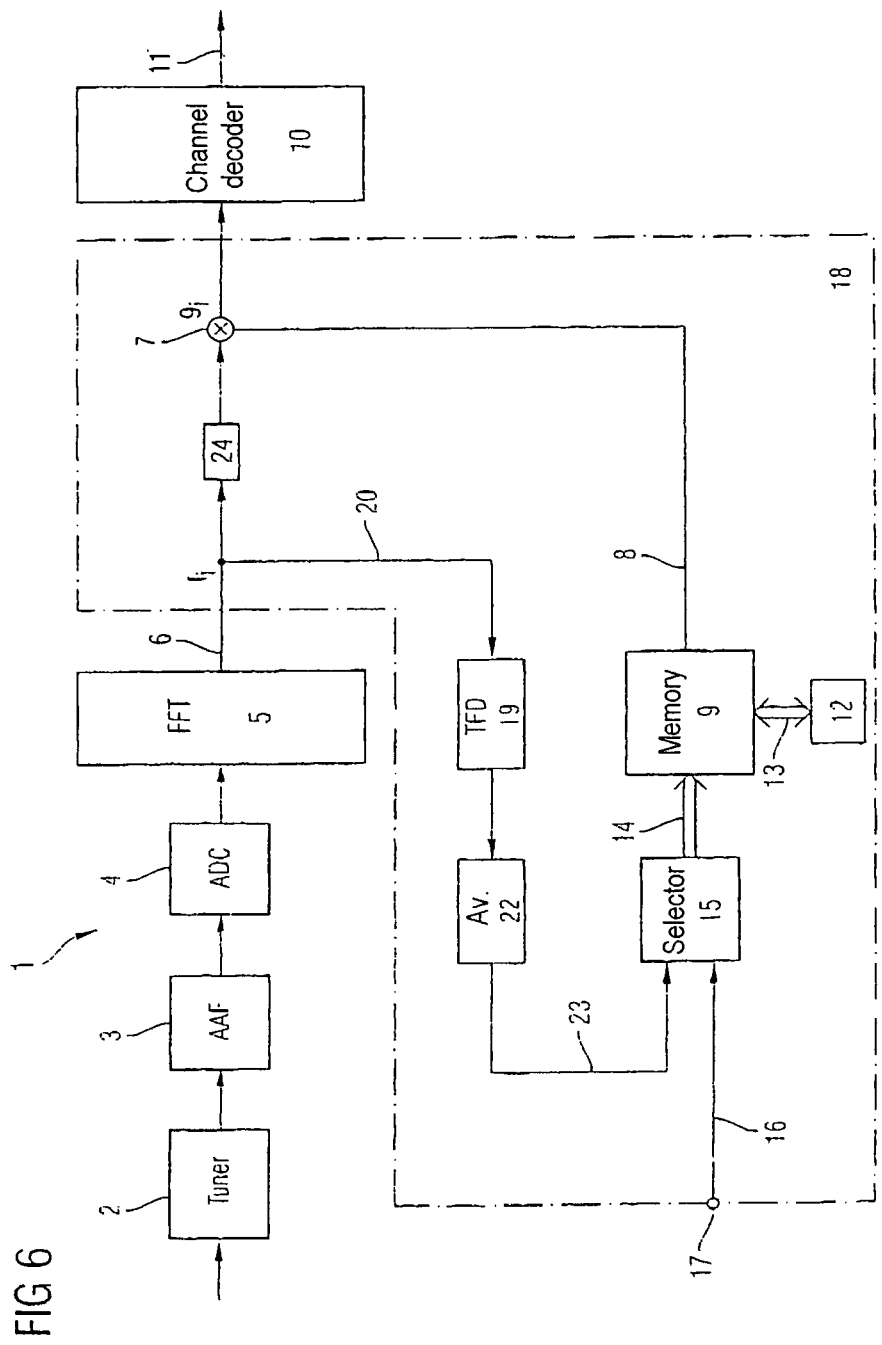
FIG. 6 shows a multicarrier signal receiver which contains an inventive weighting circuit based on a fourth embodiment.

FIG. 6 shows a further preferred embodiment of the inventive weighting circuit 18 in which the data are processed serially. In this preferred embodiment, the weighting circuit 18 comprises just one multiplier 7. The amplitudes which the computation circuit 5 has ascertained for the various carrier signals are read out serially and buffer-stored in the buffer store 24 in the embodiment shown in FIG. 6. A carrier frequency selector 19 ascertains the current carrier frequency of the carrier signal and stores the discrepancy from the nominal value in a buffer store in the averaging circuit 22. If the number of sub-bands is 1024, for example, the buffer store 24 buffer-stores 1024 amplitudes for the various carrier signals, and the buffer store in the averaging circuit 22 has 1024 sequence discrepancies written into it in succession, these being averaged by the offset averaging circuit 22. In this case, a rolling average over the last 1024*K carrier signals is preferably calculated. In one preferred embodiment, the number K is settable in this case. The amplitudes buffer-stored in the buffer store 24 for the various carrier signals are read out serially and are weighted by the multiplier 7 using the associated weighting coefficient $G_i$, which are likewise read out serially. The embodiment of the inventive weighting circuit 18 which is shown in FIG. 6 affords the advantage that just one multiplier 7 is provided, which means that the circuit complexity for implementing the weighting circuit 18 is low.

FIG. 8 shows a flowchart to explain the way in which the inventive weighting circuit works.

Following the start $S_0$, the receiver receives the multicarrier signal in a step $S_1$ and converts it into a digital carrier signal using the tuner 2, the antialiasing filter 3 and the analog-digital converter 4.

The computation circuit 5 breaks down the multicarrier signal into N different subcarriers or carrier signals having different carrier signal frequencies $f_i$ in a step $S_2$. The signal is preferably broken down using Fast Fourier Transformation. The amplitudes are preferably buffer-stored in a buffer store 24 in a step $S_3$. In a further step $S_4$, the carrier frequency selector 19 ascertains the frequency offsets for the various carrier signals.

In a further step $S_5$, the offset averaging circuit calculates an arithmetic mean for the frequency offsets which are activated by the carrier frequency selectors.

In a step $S_6$, the selector 15 selects the suitable weighting coefficient set $G_i$, which comprises a multiplicity (N) of weighting coefficients $g_i$, on the basis of the expected spurious signal energy and the average frequency offset. The selected weighting coefficient set $G_i$ is read out in step $S_7$, where the weighting coefficients are already being multiplied by the respective multicarrier signals by the multipliers 7-$_i$ in to weight them.

Next, channel decoding is performed in step $S_8$ using the channel decoder 10.

The process ends in step $S_9$.

Figure 9A:
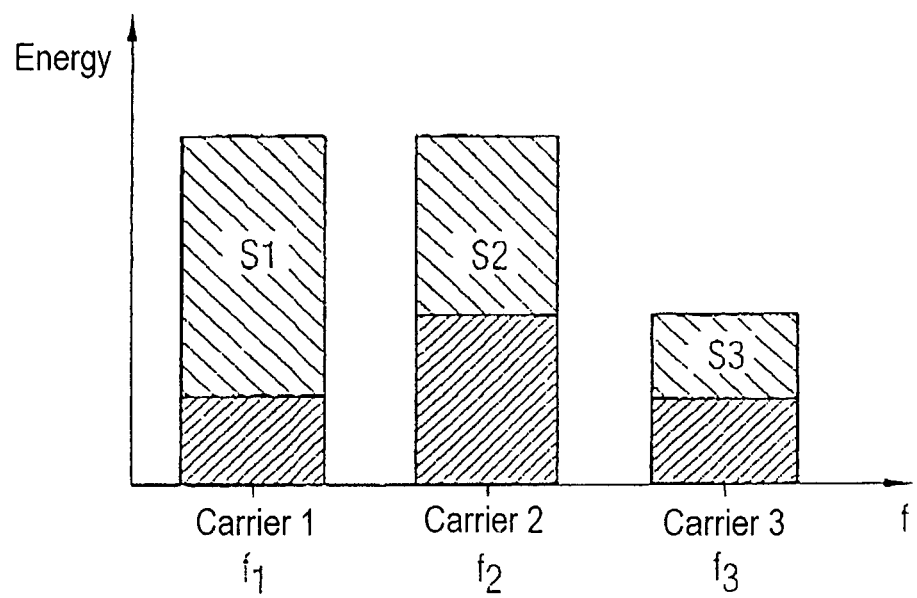
FIG. 9a shows the amplitude distribution of a multicarrier signal at the signal input of an inventive weighting circuit.

FIG. 9*a* shows three carrier signals, for example, with different carrier signal frequencies $f_1$, $f_2$, $f_3$ on the lines 6-1, 6-2, 6-3, which are weighted by the inventive weighting circuit 18. The energy of the various carrier signals is proportional to the square of the amplitudes of the carrier signals. In the example shown in FIG. 9*a*, the first carrier signal with the carrier signal frequency $f_1$ has a comparatively high useful signal energy $S_1$ and a low spurious signal energy $N_1$. The spurious signal energy $N_1$ is made up of the energy in the background noise $N_0$ and external spurious signals NF. The second multicarrier signal at the carrier signal frequency $f_2$ has the same total energy as the first carrier signal in the example shown, but the proportion of spurious signal energy $N_2$ is significantly higher in the second carrier signal. Accordingly, the signal energy $S_2$ of the second carrier signal is lower. FIG. 9*a* shows the energy of a third carrier signal, by way of example, whose spurious signal energy is at exactly the same level as the spurious signal energy $N_1$, of the first carrier signal.

Figure 9B:
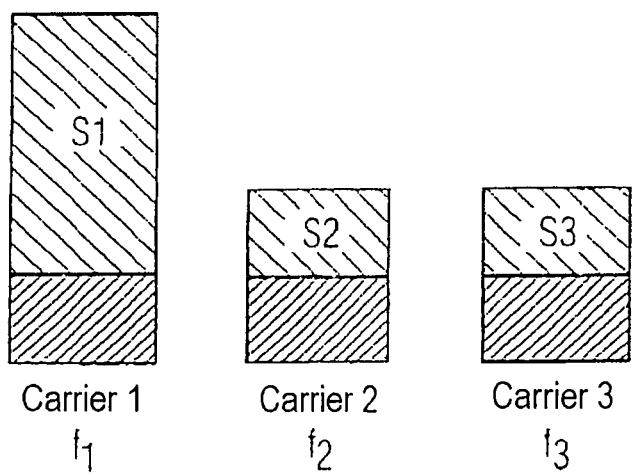
FIG. 9b shows the amplitude distribution of the multicarrier signal shown in FIG. 9a at the output of the inventive weighting circuit.

FIG. 9*b* shows the weighted carrier signals on the output lines 9-$_i$ of the inventive weighting circuit 18. The inventive weighting circuit 18 weights the three carrier signals such that the spurious signal energy $N_1'$ of the weighted first carrier signal, the spurious signal energy $N_2'$ of the second weighted carrier signal and the spurious signal energy $N_3'$ of the third weighted carrier signal are of the same magnitude. As can be seen from FIG. 9*b*, the carrier signal 2, which has a relatively small proportion of the useful signal energy in the total signal energy, has a lower weighting than the carrier signal 1, where the ratio of useful signal energy $S_1$ to spurious signal energy $N_1$ is much more favorable or greater. If the carrier signal 2 still has the same weight as the carrier signal 1 at the input of the inventive weighting circuit 18, the output of the inventive weighting circuit 18 produces the carrier signal 2 lowered to the weight of the carrier signal 3. In the inventive weighting circuit 18, the carrier signal with the higher signal-to-noise ratio SNR is provided with a higher weighting than carrier signals with a lower signal-to-noise ratio SNR. The carrier signals or subcarriers with disturbances are assessed by the inventive weighting circuit as being less reliable than the carrier signals or subcarriers with lower levels of disturbance. The inventive weighting circuit 18 strews the output disturbance profile over all subcarriers. On account of the inventive weighting circuit 18, the bit error rate BER in the data stream at the output of the channel decoder 10 is significantly reduced, which means that the reception quality of the receiver 1 is greatly improved overall.

LIST OF REFERENCE SYMBOLS

1 Receiver
2 Tuner
3 Antialiasing filter
4 Analog-digital converter
5 Computation circuit
6 Lines
7 Multiplier
8 Lines
9 Memory
10 Channel decoder
11 Output line
12 Interface
13 Programming lines
14 Address lines
15 Selector
16 Setting line
17 Setting input
18 Weighting circuit
19 Carrier frequency detector
20 Line
21 Line
22 Offset averaging circuit
23 Line
24 Buffer store
25 Estimation unit
26 Line
27 Line

The invention claimed is:

1. A weighting circuit for a receiver which is provided for receiving a multicarrier signal comprising carrier signals, comprising:
   a memory storing a plurality of weighting coefficient sets,
   a selector selecting one of the plurality of weighting coefficient sets stored in the memory on the basis of an estimated spurious signal energy in the received signal, and
   an estimation unit calculating said estimated spurious signal energy by calculating a first cross correlation value k1 as a cross correlation between the received signal and at least one spurious signal to be expected and calculating a second cross correlation value k2 as a cross correlation between the received signal and a spurious signal to be expected, which has been phase-shifted through 90 degrees, wherein said estimated spurious signal energy is calculated by $E_{spurious} \sim k_1^2 + k_2^2$;
   wherein the weighting circuit weights the carrier signal such that the spurious signal energy is of equal magnitude for all weighted carrier signals;
   wherein said estimated spurious signal energy is applied via a setting input;
   wherein said setting input is connected to the selector via a line;
   wherein the memory is programmable via an interface connected to said memory though a plurality of data lines, and
   wherein the programmable memory is connected to the selector via a plurality of address lines, the selector being capable of selecting a particular weighting coefficient set from the plurality of weighting coefficient sets stored within the memory.

2. The weighting circuit as claimed in claim 1, wherein the weighting circuit has at least one multiplier which multiplies an associated carrier signal by a stored weighting coefficient from the selected weighting coefficient set.

3. The weighting circuit as claimed in claim 1, wherein the multicarrier signal is broken down into the carrier signals by a computation circuit.

4. The weighting circuit as claimed in claim 3, wherein the computation circuit is a Fast Fourier Transformation circuit.

5. The weighting circuit as claimed in claim 4, wherein the carrier signals broken down by the computation circuit are buffer-stored in a buffer store.

\* \* \* \* \*